United States Patent
Delvecchio et al.

(10) Patent No.: US 8,607,553 B2
(45) Date of Patent: Dec. 17, 2013

(54) EXHAUST SYSTEM IMPLEMENTING SELECTIVE CATALYST FLOW CONTROL

(75) Inventors: Kerry A. Delvecchio, Dunlap, IL (US); Delbert Kramer, Metamora, IL (US); Richard W. Kruiswyk, Dunlap, IL (US); Wade J. Robel, Peoria, IL (US); Hafiz Anees, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 803 days.

(21) Appl. No.: 12/071,095

(22) Filed: Feb. 15, 2008

(65) Prior Publication Data

US 2009/0205321 A1    Aug. 20, 2009

(51) Int. Cl.
*F01N 3/10* (2006.01)
*F01N 5/04* (2006.01)
*B01D 50/00* (2006.01)

(52) U.S. Cl.
USPC ............ 60/301; 60/274; 60/276; 60/280; 60/286; 60/295; 422/170; 422/172

(58) Field of Classification Search
USPC .......... 60/274, 276, 280, 285, 287, 288, 295, 60/301, 324; 422/182, 170–172; 423/213.7, 239.1
See application file for complete search history.

(56) References Cited

U.S. PATENT DOCUMENTS

| | | | |
|---|---|---|---|
| 6,568,173 B1 * | 5/2003 | Kolmanovsky et al. ........ 60/280 |
| 6,615,580 B1 | 9/2003 | Khair et al. |
| 6,701,707 B1 | 3/2004 | Upadhyay et al. |
| 6,807,807 B2 | 10/2004 | Kagenishi |
| 6,843,971 B2 * | 1/2005 | Schafer-Sindlinger et al. ............ 423/239.2 |
| 6,989,045 B2 | 1/2006 | Bailey et al. |
| 7,005,116 B2 * | 2/2006 | Schafer-Sindlinger et al. ............ 423/239.2 |
| 7,065,958 B2 | 6/2006 | Funk et al. |
| 7,134,273 B2 | 11/2006 | Mazur et al. |
| 7,178,328 B2 | 2/2007 | Solbrig |
| 7,229,597 B2 | 6/2007 | Patchett et al. |
| 7,390,469 B2 * | 6/2008 | Montreuil et al. ......... 423/213.2 |
| 7,498,010 B2 * | 3/2009 | Andreasson et al. ...... 423/239.1 |
| 7,587,889 B2 * | 9/2009 | Frazier et al. .................. 60/285 |
| 7,765,800 B2 * | 8/2010 | Tsumagari et al. ............ 60/301 |
| 7,853,395 B2 * | 12/2010 | Guo et al. ..................... 701/102 |
| 2005/0229872 A1 | 10/2005 | Lange |
| 2005/0284137 A1 | 12/2005 | Son |
| 2006/0039843 A1 | 2/2006 | Patchett et al. |
| 2007/0113544 A1 | 5/2007 | Nishina et al. |
| 2007/0151240 A1 * | 7/2007 | Mulloy .......................... 60/599 |
| 2007/0245714 A1 | 10/2007 | Frazier et al. |

FOREIGN PATENT DOCUMENTS

JP    2005023921    *    1/2005

* cited by examiner

*Primary Examiner* — Thomas Denion
*Assistant Examiner* — Diem Tran
(74) *Attorney, Agent, or Firm* — Finnegan, Henderson, Farabow, Garrett & Dunner LLP

(57) ABSTRACT

An exhaust system for use with an engine is disclosed. The exhaust system may have a first treatment device configured to receive a flow of exhaust from the engine and convert a first constituent of the exhaust to a second constituent. The exhaust system may also have a second treatment device located downstream of the first treatment device and configured to reduce the first constituent and the second constituent. The exhaust system may further have a flow regulator configured to selectively vary a rate of exhaust passing through the first treatment device, and a controller configured to operate the flow regulator such that a desired amount of the first constituent and the second constituent is received by the second treatment device.

26 Claims, 1 Drawing Sheet

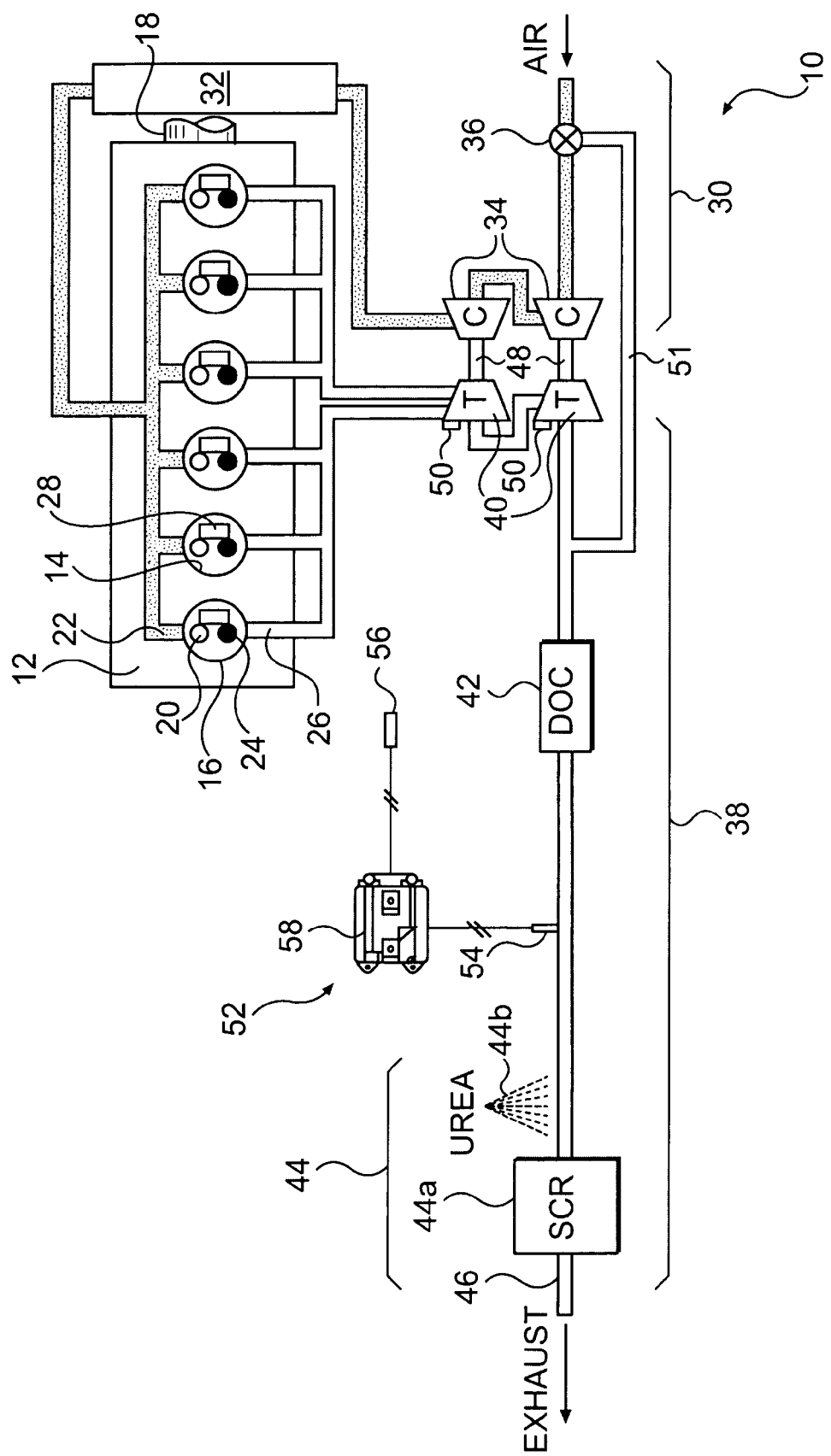

EXHAUST SYSTEM IMPLEMENTING SELECTIVE CATALYST FLOW CONTROL

TECHNICAL FIELD

The present disclosure is directed to an exhaust system and, more particularly, to an exhaust system that implements selective control of exhaust flow through a Diesel Oxidation Catalyst (DOC).

BACKGROUND

Internal combustion engines, including diesel engines, gasoline engines, gaseous fuel-powered engines, and other engines known in the art exhaust a complex mixture of air pollutants. These air pollutants may be composed of gaseous compounds such as, for example, the oxides of nitrogen (NOx). Due to increased awareness of the environment, exhaust emission standards have become more stringent, and the amount of NOx emitted from an engine may be regulated depending on the type of engine, size of engine, and/or class of engine. In order to ensure compliance with the regulation of these compounds, some engine manufacturers have implemented a strategy called Selective Catalytic Reduction (SCR).

SCR is a process where gaseous or liquid reductant (most commonly urea) is added to the exhaust gas stream of an engine and is absorbed onto a catalyst. The reductant reacts with NOx in the exhaust gas to form $H_2O$ and $N_2$. Although SCR can be effective, it is most effective when a concentration of NO to $NO_2$ supplied to the SCR is about 1:1. In order to achieve this optimum ratio, a Diesel Oxidation Catalyst (DOC) is often located upstream of the SCR to convert NO to $NO_2$.

In addition to facilitating the reduction process of the SCR, the $NO_2$ produced (i.e., converted from NO) by the DOC can also facilitate the combustion of collected particulate matter. Specifically, a particulate trap is commonly used to collect unburned particulates also known as soot. Over time, the particulate matter builds up in the trap and, if left unchecked, the particulate trap could negatively affect performance of the engine. As such, the particulate matter collected by the trap must be periodically removed through a process called regeneration. To regenerate the particulate trap, a liquid catalyst (typically diesel fuel) is injected into the exhaust flow upstream of the trap. The fuel, in the presence of $NO_2$, ignites and burns away the collected particulate matter. An efficiency of the regeneration process, like the SCR process, can be affected by the amount of $NO_2$ present in the exhaust flow.

It is known that the ratio of NO to $NO_2$ contained in the exhaust stream exiting the DOC may vary based at least partially on the flow rate of exhaust passing through the DOC and on a temperature of the exhaust. In the past, the flow rate of exhaust passing through the DOC has been almost completely dependent on operation of the engine (i.e., on a flow rate of gases combusted and subsequently exhausted from the engine). Thus, the conversion rate of NO to $NO_2$ has been controlled by varying a temperature of the exhaust.

A system implementing such a strategy is described in U.S. Pat. No. 6,807,807 (the '807 patent) issued to Kagenishi on Oct. 26, 2004. The '807 patent discloses an exhaust gas purifying apparatus having a particulate filter, an oxidation catalyst, a front oxidation catalyst, a bypass path, and a passage switching device disposed in an exhaust path. The front oxidation catalyst is disposed further upstream than the oxidation catalyst. The bypass path bypasses the upstream side and the downstream side of the front oxidation catalyst during normal operation such that the entire gas flow passes only through the oxidation catalyst and the particulate trap. The passage switching device switches the flow of exhaust gas to the front oxidation catalyst from the bypass path during filter regeneration. That is, when the filter is forcibly recovered (i.e., regenerated), the temperature of the exhaust gas is raised by an injection of fuel and is made to pass through the front oxidation catalyst such that the oxidation catalyst is sufficiently warmed and an adequate amount of NO is converted to $NO_2$ for optimum regeneration of the filter. After the oxidation catalyst is properly activated, the flow of exhaust gas is switched back to pass through the bypass path, and regeneration of the filter is completed in the presence of $NO_2$.

Although somewhat effective at controlling the conversion of NO to $NO_2$ during filter regeneration, the exhaust gas purifying apparatus of the '807 patent may be complex, costly, and lack applicability. That is, the apparatus of the '807 patent requires multiple oxidation catalysts and complicated bypass and heating structures. These components increase the complexity of the system, as well as part and assembly cost. In addition, the fuel used to heat the exhaust reduces an efficiency of the engine. Further, during some situations, such as at startup or during operation in cold ambient conditions, the elevated temperature of the exhaust alone may be insufficient to properly activate the catalyst. And, temperature control of the catalyst for use in regenerating a particulate trap may be suboptimal when used with an SCR device.

The system of the present disclosure solves one or more of the problems set forth above.

SUMMARY

One aspect of the present disclosure is directed to an exhaust system. The exhaust system may include a first treatment device configured to receive a flow of exhaust and convert a first constituent of the exhaust to a second constituent. The exhaust system may also include a second treatment device located downstream of the first treatment device and configured to reduce the first constituent and the second constituent. The exhaust system may further include a flow regulator configured to selectively vary a rate of exhaust passing through the first treatment device, and a controller configured to operate the flow regulator such that a desired amount of the first constituent and the second constituent is received by the second treatment device.

Another aspect of the present disclosure is directed to a method of operating an engine. The method may include combusting fuel to produce a flow of exhaust, and passing the exhaust through a catalyst to convert a first constituent of the exhaust to a second constituent. The method may also include reducing the first constituent and the second constituent, and selectively varying a dwell time of the exhaust within the catalyst such that a desired amount of the first constituent is converted to the second constituent. An effectiveness of reducing the first and second constituents is at least partially dependent on the desired amount.

BRIEF DESCRIPTION OF THE DRAWING

FIG. 1 is a schematic and diagrammatic illustration of an exemplary disclosed power system.

DETAILED DESCRIPTION

FIG. 1 illustrates an exemplary power system 10. For the purposes of this disclosure, power system 10 is depicted and described as a diesel-fueled, internal combustion engine. However, it is contemplated that power system 10 may embody any other type of internal combustion engine, such as, for example, a gasoline or gaseous fuel-powered engine. Power system 10 may include an engine block 12 at least partially defining a plurality of cylinders 14, and a plurality of piston assemblies 16 disposed within cylinders 14. It is contemplated that power system 10 may include any number of cylinders 14 and that cylinders 14 may be disposed in an "in-line" configuration, a "V" configuration, or any other conventional configuration.

Each piston assembly 16 may be configured to reciprocate between a bottom-dead-center (BDC) position (lower-most position within cylinder 14), and a top-dead-center (TDC) position (upper-most position within cylinder 14). In particular, piston assembly 16 may be pivotally coupled to a crankshaft 18 by way of a connecting rod (not shown). Crankshaft 18 of power system 10 may be rotatably disposed within engine block 12, and each piston assembly 16 coupled to crankshaft 18 such that a sliding motion of each piston assembly 16 within each cylinder 14 results in a rotation of crankshaft 18. Similarly, a rotation of crankshaft 18 may result in a sliding motion of piston assemblies 16. As crankshaft 18 rotates through about 180 degrees, piston assembly 16 may move through one full stroke between BDC and TDC. In one embodiment, power system 10 may be a four stroke (e.g., four cycle) engine, wherein a complete cycle includes an intake stroke (TDC to BDC), a compression stroke (BDC to TDC), a power stroke (TDC to BDC), and an exhaust stroke (BDC to TDC). It is also contemplated that power system 10 may alternatively embody a two stroke (e.g., two cycle) engine, wherein a complete cycle includes a compression/exhaust stroke (BDC to TDC) and a power/exhaust/intake stroke (TDC to BDC).

An intake valve 20 may be associated with each cylinder 14 to selectively restrict fluid flow through a respective intake port 22. Each intake valve 20 may be actuated to move or "lift" to thereby open the respective intake port 22. In a cylinder 14 having a pair of intake ports 22 and a pair of intake valves 20, the pair of intake valves 20 may be actuated by a single valve actuator (not shown) or by a pair of valve actuators (not shown). Of the four piston strokes described above, each intake valve 20 may open during a portion of the intake stroke to allow air or an air and fuel mixture to enter each respective cylinder 14 during normal operation.

An exhaust valve 24 may also be associated with each cylinder 14, and configured to selectively block a respective exhaust port 26. Each exhaust valve 24 may be lifted to thereby open the respective exhaust port 26. In a cylinder 14 having a pair of exhaust ports 26 and a pair of exhaust valves 24, the pair of exhaust valves 24 may be actuated by a single valve actuator (not shown) or by a pair of valve actuators (not shown). Of the four piston strokes described above, each exhaust valve 24 may open during a portion of the exhaust stroke to allow exhaust to be pushed from each respective cylinder 14 by the motion of piston assemblies 16.

Each of intake and exhaust valves 20, 24 may be operated in any conventional way to move from the closed or flow blocking position to an open or flow passing position in a cyclical manner. For example, intake and exhaust valves 20, 24 may be lifted by way of a cam (not shown) that is rotatably driven by crankshaft 18, by way of a hydraulic actuator (not shown), by way of an electronic actuator (not shown), or in any other manner. During normal operation of power system 10, intake and exhaust valves 20, 24 may be lifted in a predefined cycle related to the motion of piston assemblies 16. It is contemplated, however, that a variable valve actuator 28 may be associated with one or more of intake and/or exhaust valves 20, 24 to selectively interrupt the cyclical motion thereof during alternative modes of operation. In particular, one or more of intake and/or exhaust valves 20, 24 may be selectively opened, held open, closed, or held closed by variable valve actuator 28 to implement a mode of operation that varies a flow rate of exhaust directed from power system 10 to the atmosphere.

For example, variable valve actuator 28 may vary an opening timing of intake valve 20 during an intake stroke and/or a closing timing of exhaust valve 24 during a preceding exhaust stroke to implement an internal exhaust gas recirculation mode of operation where exhaust may be redirected back into power system 10 for subsequent combustion, rather than to the atmosphere. In another example, variable valve actuator 28 may maintain intake valve 20 open into a portion of the compression stroke to implement a Miller cycle mode of operation where some portion of the gases within cylinders 14 are pushed in reverse direction through inlet ports 22, rather than combusted and directed to the atmosphere. It is contemplated that variable valve actuator 28 may implement additional or alternative modes of operation known in the art to vary a flow rate of the exhaust discharged to the atmosphere, if desired.

An air induction system 30 may be associated with power system 10 and include components that condition and introduce compressed air into cylinders 14 by way of intake ports 22 and intake valves 20. For example, air induction system 30 may include an air cooler 32 located downstream of one or more compressors 34. Compressors 34 may be connected to pressurize inlet air directed through cooler 32. A throttle valve 36 may be located upstream of compressors 34 to selectively regulate (i.e., restrict) the flow of inlet air into power system 10. A restriction may result in less air entering power system 10 and, thus, less exhaust exiting power system 10. It is contemplated that air induction system 30 may include different or additional components than described above such as, for example, filtering components, compressor bypass components, and other known components.

An exhaust system 38 may also be associated with power system 10, and include components that condition and direct exhaust from cylinders 14 to the atmosphere. For example, exhaust system 38 may include one or more turbines 40 driven by the exiting exhaust, a first and a second treatment device 42, 44 disposed in series and fluidly connected downstream of turbine 40, and an exhaust outlet 46 configured to direct treated exhaust from second treatment device 44 to the atmosphere. It is contemplated that exhaust system 38 may include different or additional components than described above such as, for example, bypass components, a brake, an attenuation device, additional exhaust treatment devices, and other known components.

Turbine 40 may be located to receive exhaust leaving power system 10 via exhaust ports 26. Turbine 40 may be connected to one or more compressors 34 of air induction system 30 by way of a common shaft 48 to form a turbocharger. As the hot exhaust gases exiting power system 10 move through turbine 40 and expand against vanes (not shown) thereof, turbine 40 may rotate and drive the connected compressor 34 to pressurize inlet air.

Turbine 40 may embody a variable geometry turbine (VGT). VGTs are a variety of turbochargers having geometry adjustable to attain different aspect ratios such that adequate boost pressure may be supplied to cylinders 14 under a range of operational conditions. In one embodiment, turbine 40 may include vanes movable by an actuator 50. As these vanes move, a flow area between the vanes may change, thereby changing the aspect ratio of the turbocharger. In another embodiment, turbine 40 may have nozzle ring adjustable by actuator 50. During operation of the turbocharger, the orientation of the nozzle ring may be adjusted to vary a flow area through a nozzle portion (not shown) of turbine 40.

As the flow area of turbine 40 changes, the performance of the turbocharger may also change. For example, as the flow area decreases, the flow rate of exhaust through turbine 40 may proportionally decrease, while the pressure of the inlet air produced by compressor 34 may increase. In contrast, as the flow area of turbine 40 increases, the flow rate of exhaust through turbine 40 may proportionally increase and the pressure of the inlet air produced by compressor 34 may decrease.

It is contemplated that a wastegate (not shown) or a pressure relief valve may also or alternatively be associated with compressor 34 and/or turbine 40. The wastegate and/or pressure relief valve may also or alternatively be operated by actuator 50, if desired, to affect the flow rate of fluid through power system 10. Thus, actuator 50, whether associated with the variable flow area of turbine 40, a wastegate, and/or a pressure relief valve, may function to vary the flow rate of fluid through power system 10 and, subsequently, the flow rate of exhaust exiting power system 10.

First treatment device 42 may cooperate with second treatment device 44 to condition the exhaust flow from power system 10. In particular, first treatment device 42 may embody a catalyst configured to convert a first constituent of the exhaust flow to a second constituent, which may be more susceptible to conditioning within second treatment device 44. In one example, first treatment device 42 may be a catalyst such as a diesel oxidation catalyst (DOC). As a DOC, first treatment device 42 may include a porous ceramic honeycomb structure or metal mesh substrate coated with a material, for example a precious metal, that catalyzes a chemical reaction to alter the composition of the exhaust. For example, first treatment device 42 may include platinum or vanadium to facilitate the conversion of NO to $NO_2$.

The conversion rate of first treatment device 42 may be related to a dwell time of the exhaust within first treatment device 42, and to a temperature of the exhaust. That is, for a given volume of exhaust at a given temperature, a greater time spent within first treatment device 42 may result in more NO being converted to $NO_2$. Similarly, for the same volume and a given flow rate through first treatment device 42, a higher temperature exhaust may generally relate to a higher conversion rate of NO to $NO_2$.

Second treatment device 44 may receive exhaust from first treatment device 42 to reduce constituents of the exhaust to innocuous gases. In particular, second treatment device 44 may embody a Selective Catalytic Reduction (SCR) device. As an SCR device, second treatment device 44 may include a catalyst substrate 44a located downstream from a reductant injector 44b. A gaseous or liquid reductant, most commonly urea ($NH_3$), may be sprayed or otherwise advanced into the exhaust upstream of catalyst substrate 44a. As the reductant is absorbed onto the surface of catalyst substrate 44a, the reductant may react with NOx (NO and $NO_2$) in the exhaust gas to form water ($H_2O$) and elemental nitrogen ($N_2$). The reduction process performed by second treatment device 44 may be most effective when a concentration of NO to $NO_2$ supplied to second treatment device 44 is about 1:1.

It is contemplated that an external EGR circuit 51 may also be associated with power system 10 to redirect a portion of the exhaust from exhaust system 38 to air induction system 30, if desired. EGR circuit 51 may be connected to exhaust system 38 at a location downstream of turbine 40, and connected to air induction system 30 at a location upstream of compressor 34. In one embodiment, throttle valve 36 may perform dual functions, regulating the flow of inlet air and the flow of exhaust into power system 10. In another example, a dedicated exhaust valve (not shown) may be located within EGR circuit 51 to control the flow rate of exhaust passing to air induction system 30. In addition to reducing the formulation of NOx by lowering a combustion temperature of power system 10, the recirculation of exhaust gases may also reduce a flow rate of exhaust passing through first and second treatment devices 42, 44. And, as explained above, a lower flow rate may relate to an increased dwell time of the exhaust within first treatment device 42 and a greater conversion of NO to $NO_2$.

A control system 52 may be associated with power system 10 and include component configured to regulate the dwell time of exhaust within first treatment device 42 in order to enhance the operation of second treatment device 44. Specifically, control system 52 may include a sensor 54 configured to determine a characteristic of the exhaust flow from power system 10; a flow regulator 56 configured to affect the flow rate of exhaust through and, hence, the dwell time of exhaust within first treatment device 42; and a controller 58 in communication with sensor 54 and flow regulator 56. Controller 58 may be configured to control operation of flow regulator 56 in response to input received from sensor 54.

Sensor 54 may embody a constituent sensor configured to generate a signal indicative of the presence of a particular constituent within the exhaust flow. For instance, sensor 54 may be a NOx sensor configured to determine an amount (i.e., quantity, relative percent, ratio, etc.) of NO and/or $NO_2$. If embodied as a physical sensor, sensor 54 may be located upstream or downstream of first treatment device 42. When located upstream of first treatment device 42, sensor 54 may be situated to sense a production of NOx by power system 10. When located downstream of first treatment device 42, sensor 54 may be situated to sense the production of NOx and/or a conversion effectiveness of first treatment device 42. Sensor 54 may generate a signal indicative of these measurements and send them to controller 58.

It is contemplated that sensor 54 may alternatively embody a virtual sensor. A virtual sensor may be a model-driven estimate based on one or more known or sensed operational parameters of power system 10 and/or first treatment device 42. For example, based on a known operating speed, load, temperature, boost pressure, and/or other parameter of power system 10, a model may be referenced to determine an amount of NO and/or $NO_2$ produced by power system 10. Similarly, based on a known or estimated NOx production of power system 10, a flow rate of exhaust exiting power system 10, and/or a temperature of the exhaust, the model may be referenced to determine an amount of NO and/or $NO_2$ leaving first treatment device 42 and entering second treatment device 44. As a result, the signal directed from sensor 54 to controller 58 may be based on calculated and/or estimated values rather than direct measurements, if desired.

Flow regulator 56 may be associated with one or more components of power system 10, air induction system 30, exhaust system 38, and/or EGR circuit 51 to control the flow rate of exhaust passing through first treatment device 42 (i.e., to control the dwell time of exhaust within first treatment device 42). For example, flow regulator 56 may be associated with throttle valve 36 to regulate the flow of air and/or exhaust entering power system 10, with variable valve actuator 28 to regulate modes of operation affecting the rate of exhaust exiting power system 10, and/or with actuator 50 to regulate operation of the turbocharger. In response to a signal from controller 58, flow regulator 56 may selectively increase or decrease the flow rate of exhaust through first treatment device 42. It is contemplated that flow regulator 56 may be integral with throttle valve 36, variable valve actuator 28, and/or actuator 50, if desired.

Controller 58 may embody a single microprocessor or multiple microprocessors that include a means for controlling an operation of flow regulator 56 in response to signals received from sensor 54. Numerous commercially available microprocessors can be configured to perform the functions of controller 58. It should be appreciated that controller 58 could readily embody a general power system microprocessor capable of controlling numerous power system functions and modes of operation. Various other known circuits may be associated with controller 58, including power supply circuitry, signal-conditioning circuitry, solenoid driver circuitry, communication circuitry, and other appropriate circuitry.

Controller 58 may operate the flow regulator 56 such that a desired amount of a first constituent and a second constituent are received by second treatment device 44. Specifically, in order to enhance the reducing effectiveness of second treatment device 44, controller 58 may operate flow regulator 56 to provide a ratio of $NO:NO_2$ exiting first treatment device 42 as close to 1:1, as possible, without negatively affecting operation of power system 10. For example, based on the signal received from sensor 54, controller 58 may selectively increase or decrease the dwell time of exhaust within first treatment device 42 to increase or decrease the conversion of NO to $NO_2$. As described above, the dwell time may be increased by decreasing a flow rate of exhaust through first treatment device 42. Similarly, the dwell time may be decreased by increasing a flow rate of exhaust through first treatment device 42.

Controller 58 may vary the dwell time of exhaust within first treatment device 42 in an open- or a closed-loop manner. Specifically, based on the signal from sensor 54 and known operating parameters of power system 10 and/or first treatment device 42, controller 58 may reference a relationship map stored in memory thereof and determine a desired flow rate of exhaust through first treatment device that results in the ratio of $NO:NO_2$ exiting first treatment device 42 nearing 1:1. From the same or an additional map, controller 58 may determine a change(s) to throttle valve 36, variable valve actuator 28, and/or actuator 50 that results in the desired flow rate, and then operate flow regulator 56 to affect the change(s). Alternatively, controller 58 may incrementally affect changes to throttle valve 36, variable valve actuator 28, and/or actuator 50 until the signal from sensor 54 indicates the actual ratio of $NO:NO_2$ exiting first treatment device 42 is within a threshold of 1:1.

INDUSTRIAL APPLICABILITY

The exhaust system of the present disclosure may be applicable to any power system having a treatment device, where performance of the device is enhanced when a particular ratio of exhaust constituents is received by the device. Although applicable to a range of treatment devices, the disclosed exhaust system may be primarily beneficial when associated with a selective catalytic reduction (SCR) device benefiting from a 1:1 ratio of NO to NO2. The disclosed system provides the enhancing $NO:NO_2$ ratio by selectively regulating a dwell time of exhaust within an upstream located diesel oxidation catalyst (DOC). The operation of power system 10 will now be explained.

Referring to FIG. 1, air and fuel may be pressurized and forced into the combustion chambers of power system 10 for subsequent combustion. Fuel may be injected into the combustion chambers of power system 10, mixed with the pressurized air therein, and combusted by power system 10 to produce a mechanical work output and an exhaust flow of hot gases. The exhaust flow may contain a complex mixture of air pollutants composed of gaseous material, which can include oxides of nitrogen (NOx). As this NOx laden exhaust flow is directed from the combustion chambers through first treatment device 42, NO may be converted to $NO_2$.

To enhance operation of second treatment device 44, controller 58 may regulate the flow of exhaust passing through first treatment device 42. Specifically, in response to a signal received from sensor 54 indicative of an amount of NO and/or $NO_2$ within the exhaust flow (upstream or downstream of first treatment device 42), controller 58 may operate flow regulator 56 to increase or decrease the flow rate of exhaust passing through first treatment device 42. An increase in the rate of exhaust flowing through first treatment device 42 may result in a shorter dwell time of the exhaust within first treatment device. In contrast, a decrease in the rate of exhaust flowing through first treatment device 42 may result in a longer dwell time. A shorter dwell time may facilitate a lesser amount of NO being converted to $NO_2$, while a longer dwell time may facilitate a greater amount of NO be converted.

Several advantages may be associated with the currently disclosed exhaust system. In particular, because the disclosed exhaust system may utilize only a single oxidation catalyst, it may be simple, reliable, and relatively inexpensive. Further, because the disclosed exhaust system may utilize existing components for regulation of the dwell time without significantly impacting fuel consumption of the associated power system, efficiency of the power system may be maintained. And, because the dwell time may be adjusted to affect conversion efficiency at any ambient temperature, the disclosed exhaust system may be useful through a range of operating conditions. In addition, although described as being useful in conjunction with an SCR device, the disclosed exhaust system may be used with many different treatment devices.

It will be apparent to those skilled in the art that various modifications and variations can be made to the system of the present disclosure without departing from the scope of the disclosure. Other embodiments will be apparent to those skilled in the art from consideration of the specification and practice of the system disclosed herein. For example, it is contemplated that in addition to regulating the dwell time of exhaust within first treatment device 42 to vary a conversion amount of NO to $NO_2$, conventional regulation of the exhaust temperature may also be implemented. It is intended that the specification and examples be considered as exemplary only, with a true scope of the disclosure being indicated by the following claims and their equivalents.

What is claimed is:

1. An exhaust system, comprising:
  a first treatment device configured to receive a flow of exhaust and convert a first constituent of the exhaust to a second constituent;
  a second treatment device located downstream of the first treatment device and configured to reduce the first constituent and the second constituent;
  a flow regulator configured to selectively vary a rate of exhaust passing through the first treatment device while maintaining a combination of a quantity of exhaust passing through the first treatment device and a quantity of reductant added to the exhaust equal to a quantity of exhaust passing through the second treatment device;

a controller configured to operate the flow regulator such that a desired amount of the first constituent and the second constituent is received by the second treatment device;

a turbocharger disposed upstream of the first treatment device; and an actuator connected to the turbocharger and configured to adjust a position of one of a vane and a nozzle ring of the turbocharger, wherein the flow regulator is configured to vary the rate of the exhaust passing through the first treatment device by affecting operation of the actuator.

2. The exhaust system of claim 1, wherein the flow regulator varies a dwell time of the exhaust within the first treatment device by varying the rate of the exhaust passing through the first treatment device, the dwell time affecting a conversion efficiency of the first treatment device.

3. The exhaust system of claim 1, wherein the flow regulator also varies the rate of the exhaust passing through the first treatment device by restricting a flow of gas into an engine that produces the exhaust.

4. The exhaust system of claim 1, wherein the first treatment device is a diesel oxidation catalyst and the second treatment device is an SCR device.

5. The exhaust system of claim 1, further including an engine directing the flow of exhaust to the first treatment device; and a throttle valve fluidly connected to an inlet of the engine, wherein the flow regulator is configured to vary the rate of the exhaust passing through the first treatment device by affecting operation of the throttle valve based on a reduction effectiveness of the second treatment device.

6. The exhaust system of claim 1, wherein the flow regulator is formed integral with the actuator.

7. The exhaust system of claim 1, wherein the flow regulator is configured to vary a ratio of NO to $NO_2$ in the exhaust received by the second treatment device while maintaining the combination of the quantity of exhaust passing through the first treatment device and the quantity of reductant added to the exhaust equal to the quantity of exhaust passing through the second treatment device.

8. The exhaust system of claim 1, wherein the first and second constituents are oxides of nitrogen.

9. The exhaust system of claim 8, wherein the desired amount is a ratio of NO to $NO_2$.

10. The exhaust system of claim 9, wherein the ratio is about 1:1.

11. The exhaust system of claim 1, further including a sensor configured to generate a signal indicative of a characteristic of the exhaust, wherein the controller operates the flow regulator based at least partially on the signal.

12. The exhaust system of claim 11, wherein the signal is indicative of an amount of at least one of the first and second constituents in the exhaust flow.

13. The exhaust system of claim 12, wherein the sensor is a virtual sensor.

14. The exhaust system of claim 13, wherein the amount of the at least one of the first and second constituents is determined based on known operating conditions of an engine that produces the exhaust.

15. The exhaust system of claim 1, wherein the controller is configured to selectively vary operation of the flow regulator and the actuator in response to a signal indicative of a $NO_x$ level of the exhaust.

16. The exhaust system of claim 15, wherein selectively varying operation of the actuator comprises varying a flow area of the turbocharger in response to the signal and based on a reduction effectiveness of the second treatment device.

17. A method of operating an engine, comprising:
combusting fuel with the engine to produce a flow of exhaust;

passing the exhaust through a first catalyst to convert a first constituent of the exhaust to a second constituent;

reducing the first constituent and the second constituent at a second catalyst downstream of the first catalyst; and selectively varying a dwell time of the exhaust within the first catalyst such that a desired amount of the first constituent is converted to the second constituent, wherein an effectiveness of reducing the first and second constituents is at least partially dependent on the desired amount;

wherein the engine includes a turbocharger and an actuator, and the turbocharger includes one of a vane and a nozzle ring, the actuator configured to adjust a position of the one of the vane and the nozzle ring; and wherein selectively varying the dwell time of the exhaust within the first catalyst is accomplished by controlling a flow regulator to selectively vary a rate of exhaust passing through the first catalyst by affecting operation of the actuator, the flow regulator selectively varying the rate of exhaust passing through the first catalyst while maintaining a combination of a quantity of exhaust passing through the first catalyst and a quantity of reductant added to the exhaust equal to a quantity of exhaust passing through the second catalyst.

18. The method of claim 17, wherein the first catalyst is a diesel oxidation catalyst.

19. The method of claim 17, wherein selectively varying the dwell time of the exhaust within the first catalyst is accomplished by controlling the flow regulator to affect operation of a throttle valve fluidly connected to an inlet of the engine based on a reduction effectiveness of the second treatment device.

20. The method of claim 17, wherein the first and second constituents are oxides of nitrogen.

21. The method of claim 20, wherein the desired amount is a ratio of NO to $NO_2$.

22. The method of claim 21, wherein the ratio is about 1:1.

23. The method of claim 17, further including sensing a characteristic of the exhaust, wherein the dwell time is varied based at least partially on the characteristic.

24. The method of claim 23, further including calculating an amount of the first constituent converted to the second constituent based at least partially on the sensed characteristic and known operating conditions of the engine.

25. A power system, comprising:
an engine including an actuator, the engine configured to combust fuel and produce a flow of exhaust;

a turbocharger including one of a vane and a nozzle ring, the turbocharger receiving the flow of exhaust from the engine;

a passageway configured to direct exhaust away from the engine to the atmosphere;

an oxidation catalyst disposed within the passageway and receiving the flow of exhaust from the turbocharger, the oxidation catalyst configured to convert NO to $NO_2$;

an SCR device located within the passageway downstream of the diesel oxidation catalyst and configured to reduce NO and $NO_2$ to elemental components;

a flow regulator configured to selectively vary a dwell time of the exhaust within the diesel oxidation catalyst; and a controller configured to receive a signal indicative of a $NO_x$ level of the exhaust and to operate the flow regulator based on the signal such that a desired ratio of $NO:NO_2$ of about 1:1 is received by the SCR device;

wherein the flow regulator is configured to selectively vary the dwell time of the exhaust within the diesel oxidation catalyst by restricting a flow of gas into the engine, thereby varying the rate of the exhaust passing through the oxidation catalyst, wherein the flow regulator is also configured to vary the rate of the exhaust passing through the oxidation catalyst by operating the actuator to adjust a position of the one of the vane and the nozzle ring in response to a command received from the controller based on the signal, and wherein the flow regulator is further configured to vary the rate of the exhaust passing through the oxidation catalyst while maintaining a combination of a quantity of the exhaust passing through the oxidation catalyst and a quantity of reductant added to the exhaust equal to a quantity of the exhaust passing through the SCR device.

26. The power system of claim 25, wherein the flow regulator is configured to vary the dwell time of the exhaust within the oxidation catalyst by affecting operation of a throttle valve fluidly connected to an inlet of the engine.

* * * * *